United States Patent [19]

Kawaji et al.

[11] 4,101,879

[45] Jul. 18, 1978

[54] CURSOR MOVEMENT CONTROL DEVICE FOR SCREEN-SEGMENTED DISPLAY APPARATUSES

[75] Inventors: Mitsuo Kawaji; Toshio Usui; Masaichiro Kawano, all of Hitachi, Japan

[73] Assignee: Hitachi, Ltd., Japan

[21] Appl. No.: 749,973

[22] Filed: Dec. 13, 1976

[30] Foreign Application Priority Data

Dec. 26, 1975 [JP] Japan ............................... 50-156413

[51] Int. Cl.$^2$ ................................................ G06F 3/14

[52] U.S. Cl. .............................. 340/324 AD; 340/154

[58] Field of Search ............ 340/324 AD, 324 A, 154

[56] References Cited

U.S. PATENT DOCUMENTS

| | | | |
|---|---|---|---|
| 3,967,266 | 6/1976 | Roy | 340/324 AD |
| 3,974,493 | 8/1976 | deCavaignac et al. | 340/324 AD |

*Primary Examiner*—Marshall M. Curtis

*Attorney, Agent, or Firm*—Craig & Antonelli

[57] ABSTRACT

A cursor movement control a screen-segmented display apparatus in which the cursor is moved line by line within one divided section. The apparatus comprises a horizontal cursor register for storing the horizontal position of the cursor on display, a vertical cursor register for storing the vertical position of the cursor on display, a starting column register for storing the cursor starting column on one divided section, and a last column register for storing the cursor last column on the section. The contents of the horizontal cursor register are changed by pulses of an external pulse source generated in response to a command for moving the cursor. When the contents of the horizontal cursor register coincide with that of the last column register, the horizontal cursor register is stored with the starting column of the starting column register and at the same time the contents of the vertical cursor register are changed to set the cursor forward by one line.

6 Claims, 4 Drawing Figures

F I G. I

CURSOR MOVEMENT CONTROL DEVICE FOR SCREEN-SEGMENTED DISPLAY APPARATUSES

BACKGROUND OF THE INVENTION

This invention relates to a screen-segmented display device in a display apparatus, or more in particular to a device for controlling the movement of a cursor for designating the writing position of data on the display screen.

In an apparatus for displaying characters or symbols on the CRT screen, the CRT screen is segmented into a multiplicity of small portions so that one character or symbol is displayed in each of the portions. A CRT screen with the scan of 16 lines and 40 columns, for example, will display 640 portions. In writing a character or symbol in a portion on the CRT screen, a short bright line called a cursor is displayed on the under side of the particular portion to designate the writing position. After moving the cursor to the desired position, a character code is supplied to the CRT display apparatus from the keyboard or an external computer, thus enabling accurate writing of data in the designated position on the screen.

The address of the cursor is generally determined by storing the related horizontal and vertical addresses in a cursor register. This address is subject to change in response to a command signal from the keyboard or an external computer. Following the writing of a character in the position on the screen designated by the cursor, the data in the cursor register is automatically updated to proceed to the next characterwriting position. When the cursor reaches the extreme right end of a line, it is automatically relocated to the left end of the next line. In this way, the cursor is moved to the bottom line in sequence.

In a well-known display apparatus, the required information, such as headings, are displayed on the screen according to a predetermined program so that data corresponding to each heading is adapted to be written at the side of the particular heading in response to the cursor designation by way of the keyboard. This type of CRT display apparatus is usually provided with a cursor skip function whereby the cursor is directly moved to the next writing position by skipping those headings to be fixedly displayed or sections to be left blank, thus eliminating an erroneous writing or erasure of headings.

As explained above, the cursor is moved from left to right ends of the screen line by line while skipping those portions requiring no writing. Assume that the screen is divided into two parts laterally, i.e., into right and left sections. The cursor starts at the left end of the first line in the left screen section and is moved from the first line in the left screen section to the first line in the right screen section, the second line in the left screen section, the second line in the right screen section, to the third line in the left screen section, and so on. Since the right and left screen sections are displayed in independent data blocks, the line-by-line alternate data writing in left and right screen sections complicates not only the writing operation but also the program processing. A suggested method for obviating this shortcoming consists in formulating a program so as to move the cursor line-by-line first only in the left screen section, followed by line-by-line movement in the right screen section. The disadvantage of this method is the complexity of programming resulting from the line-by-line movement of the cursor in each screen section.

SUMMARY OF THE INVENTION

Accordingly, it is an object of the present invention to provide a cursor movement control device for a screen-segmented display apparatus for displaying different data in each section of an arbitrarily-divided display screen, wherein the cursor for designating the position of the data to be written on the screen is moved line by line in each section separately.

Another object of the invention is to provide a cursor movement control device for the screen-segmented display apparatus wherein the cursor is moved line by line in each section by a device independent of the data display program accompanying an external computer.

According to the present invention, there is provided a cursor movement control device comprising a plurality of registers for storing the addresses of the first and last positions of each cursor-displayed section of the segmented screen, wherein associated cursor registers are so controlled that the data stored in the cursor registers corresponding to position displayed by the cursors is compared with the data stored in the registers storing the addresses of the first and last positions to move the cursor, line by line, in the section.

BRIEF DESCRIPTION OF THE DRAWINGS

FIGS. 3 and 4 are diagrams for explaining the sequence of cursor movement on the screen sections according to the invention, in which FIG. 3 shows the case where the screen is segmented only in the horizontal direction (as viewed in the drawing) and FIG. 4 the case where the screen is segmented in both horizontal and vertical directions.

DESCRIPTION OF THE PREFERRED EMBODIMENTS

Figure 1:
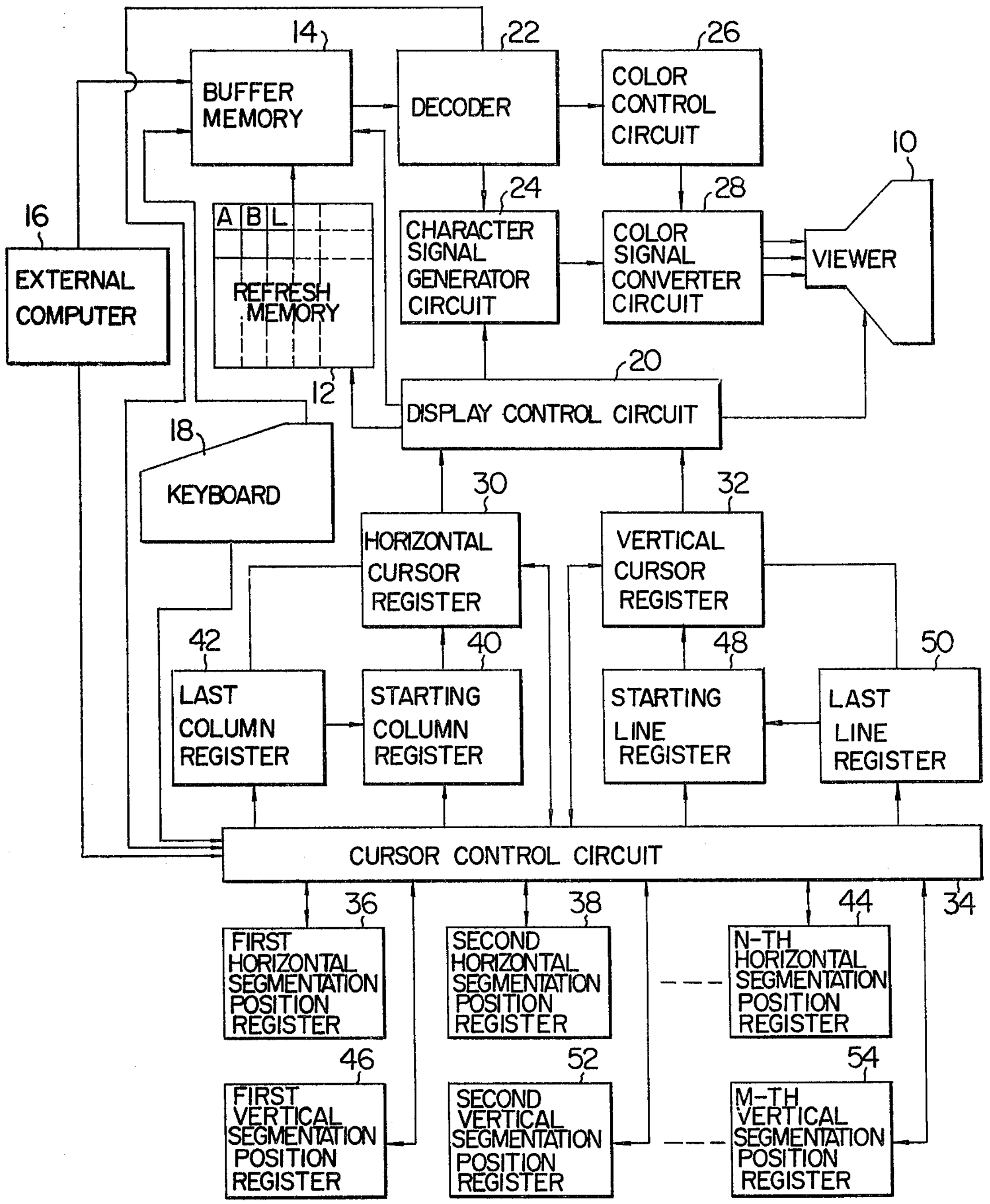
FIG. 1 is a block diagram showing an embodiment of the present invention.

A viewer 10 shown in FIG. 1 is a color display apparatus of the raster scan type, the screen of which has 16 lines and 40 columns and therefore is segmented into 640 small sections. Each section is adapted to display one character. Each character line on the screen is comprised of 12 scanning lines.

A refresh memory 12 shown in FIG. 1 is constructed such that characters or symbols displayed on the screen of the viewer 10 are stored in the form of codes corresponding to the display positions on the screen. The refresh memory 12 includes memory units of 15 lines and 40 columns and, coupled with a buffer memory 14 with one line and 40 columns, make up 640 memories with 16 lines and 40 columns like the screen of the viewer 10. Each memory has a 16-bit memory elements so that 8 bits are used for character codes, 4 bits for cursor codes, 3 bits for color codes and one bit for a character flicker command code.

The code signals of characters or symbols displayed on the viewer 10 are stored in the refresh memory 12 at positions corresponding to the display positions on the screen of the viewer 10 by way of an external computer 16 or keyboard 18 through a buffer memory 14. The operation for storing code signals in the memory 12 or 14 is effected by a display control circuit 20. The buffer memory 14 is configured to store a line of 40 characters of code signals. With the scanning of the screen, the character code signals are read out successively by a decoder 22. Since each character line includes 12 scanning lines, the buffer memory 14 accomplishes 12 cycle shifts during the display of one line. Upon completion of the display of a line, a code signal for the next line is transferred from the output area of the refresh memory 12 to the buffer memory 14. At the same time, the code signal for the line, the display of which has been completed, is transferred from the buffer memory 14 to the input area of the refresh memory 12. In this way, each time of display of one frame, one cycle shift is accomplished in the memory system comprising the refresh memory 12 and the buffer memory 14.

Figure 2:
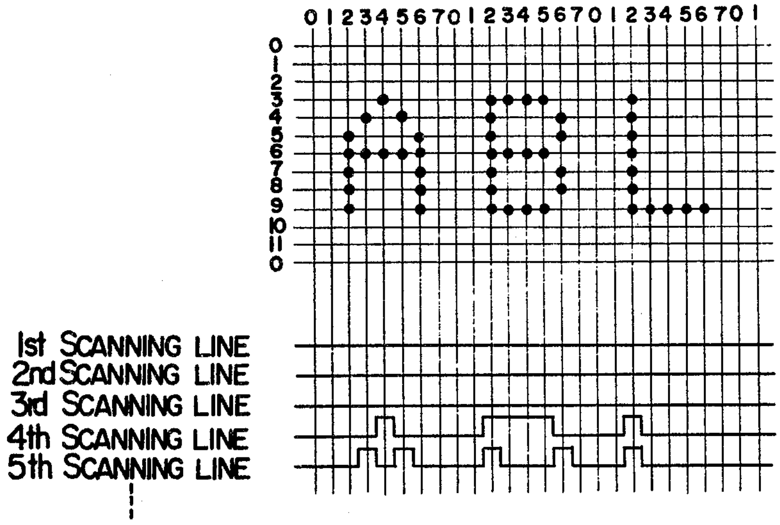
FIG. 2 is a diagram for explaining a method for displaying a character on the screen in the device shown in FIG. 1.

Of the code signals read by the decoder 22, character codes are applied to a character signal generator circuit 24, color codes to a color control circuit 26, and cursor codes to a cursor control circuit 34. As shown in FIG. 2, the character signal generator circuit 24 generates a brightness modulation signal and applies it to a color signal converter circuit 28 in response to a signal produced from the display control circuit 20 for indicating where the scanning line stands. In response to a brightness modulation signal from the character signal generator circuit 24 and a signal from the color control circuit 26, the converter circuit 28 produces three color signals representing three colors, which are applied to the viewer 10. The viewer 10, upon application thereto of the color signals and horizontal and vertical level signals produced from the control circuit 20, displays characters or symbols of predetermined color at predetermined positions on the CRT screen.

In writing a character or symbol on the screen of the viewer 10, the cursor first designates a writing position, after which a code signal is supplied to the buffer memory 14 from the external computer 16 or the keyboard 18. When a corresponding code address circulating in the memory reaches the input area of the buffer memory 14, that code signal is registered at a corresponding address. The cursor position is set by the horizontal cursor register 30 for designating the associated horizontal position and the vertical cursor register 32 for designating the associated vertical position. The cursor may be altered by changing the content of the cursor register 30 or 32 through the cursor control circuit 34 in response to a signal from the external computer 16 or keyboard 18. The instant a character is written at a cursor-designated position by way of the keyboard 18, for example, the keyboard 18 supplies a pulse to the horizontal cursor register 30 via the cursor control circuit 34 thereby to shift the cursor rightward by one column. When the cursor reaches the right end of the screen, a pulse is applied from the control circuit 34 to the vertical cursor register 32, so that the cursor is transferred to the next line while at the same time changing the data in the horizontal cursor register 30 to a signal representing the level of the left end of the screen. During this scanning process by the cursor, certain portions may be skipped as required. This skip is designated by the cursor skip set code or cursor skip reset code inserted before and behind one or a plurality of data to be skipped by the cursor, among the data stored in the refresh memory 12. The cursor skip codes are read by the decoder 22 and applied to the cursor control circuit 34. This control circuit 34 applies a series of pulses corresponding to the number of characters or lines to be skipped, to the horizontal or vertical cursor register 30 or 32, thereby accomplishing the predetermined skip.

Figure 3:
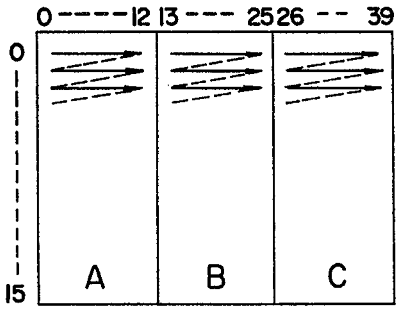

Assume that the screen of the viewer 10 is segmented into three sections A, B and C as shown in FIG. 3. According to the invention, the cursor first moves line by line from left to right from the first to 16th lines in the section A; Upon completion of the cursor movement in the section A, the cursor moves in similar manner in the section B, followed by transfer to the section C. In the case of the embodiment of FIG. 3, the columns to the extreme left in the sections A, B, and C, i.e., the starting columns of the respective screen sections coincide with columns "0", "13" and "26" respectively. First, the starting column "0" of the screen section A is transferred to the horizontal cursor register 30 through the cursor control circuit 34 from the external computer 16. Then the starting column "13" of the section B is transferred from the external computer 16 to the first horizontal segmentation position register 36 and stored therein through the cursor control circuit 34. In similar manner, the starting column "26" of the screen section C is stored in the second horizontal segmentation position register 38. A total of $n$ horizontal segmentation position registers are provided for segmenting the screen into $(n + 1)$ sections in the horizontal direction. The vertical cursor register 32 is stored with "0" by the cursor control circuit 34 in response to a command from the external computer 16. For the display of screen section A, the starting column register 40 and the last column register 42 are stored with "0" and "13" respectively, "13" representing the starting column of the screen section B.

Since the horizontal and vertical cursor registers 30 and 32 are stored with "0", the cursor is positioned at the upper left corner of the screen. Under this condition, a particular code of the character to be displayed on the screen is supplied to the buffer memory 14 by the external computer 16 or keyboard 18 and stored therein, while at the same time the cursor control circuit 34 supplies one pulse to the horizontal cursor register 30, with the result that the data in the horizontal cursor register 30 changes to "1" thereby to move the cursor by one column rightward. In the case where there is no need to write a character in the screen, the cursor control circuit 34 is ordered by the external computer 16 or the keyboard 18 to move the cursor so that the cursor may be moved without any writing process. When required, this cursor is adapted to skip a certain portion. The data in the horizontal cursor register 30 which is augmented with the horizontal movement of the cursor is compared with the data stored in the last column register 42. If the data in the register 30 coincides with "13" or the data in the register 42, the cursor control circuit 34 causes the horizontal cursor register 30 to store the value "0", i.e., the data in the starting column register 40, while at the same time applying one pulse to the vertical cursor register 32. As a result, the cursor is moved to the left end of the second line. In similar fashion, the cursor moves between 1st and 13th columns, line by line, as shown in screen section A of FIG. 3. After the cursor has moved to the last column (13th column) of the last line (16th line) of section A, the data in the registers 30 and 42 are found to coincide with each other, the cursor control circuit 34 causes the value "13" in the last column register 42 to be stored in the starting column register 40 and the horizontal cursor register 30, while at the same time causing the value "26" in the second horizontal segmentation position register 38 to be stored in the last column register 42. Further, the data in the vertical cursor register 32 is reduced to "0". As a consequence, the cursor is positioned at the upper left corner, i.e., on the first line of the 14th column. Subsequently, each time the data in the horizontal cursor register 30 augmented with cursor rightward movement coincides with the value "26" in the last column register 42, the value "13" in the starting column register 40 is stored in the horizontal cursor register 30, while at the same time applying one pulse to the vertical cursor register 32 to increase the data therein by "1". This process is followed by cursor movement in section B like in section A and then transferred to section C. In this case, "40" is stored in the last column register 42. In the case where the screen is segmented into $(n + 1)$ sections laterally, $n$ registers are used including the first horizontal segmentation position register 36 to the n-th horizontal segmentation position register 44.

Figure 4:
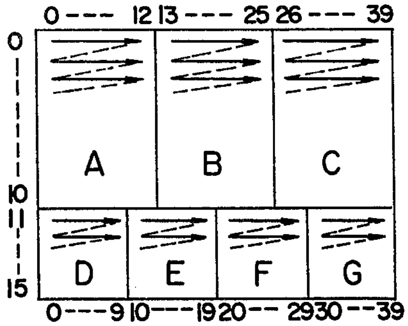

Apart from the case where the screen is divided horizontally, another case involving vertical segmentation of the screen will be described with reference to FIG. 4. In this case, the screen is segmented into 7 sections including sections A, B, C, D, E, F and G. The starting columns "13", "26", "10", "20" and "30" of the sections B, C, E, F and G are registered in the first to fifth horizontal segmentation position registers 36, 38 and so on respectively. Also, the starting lines "11" of the sections D, E, F and G are registered in the first vertical segmentation position register 46. Further, the data in the horizontal cursor register 30 and the starting column register 40 are set to "0", while "13" or the value in the first horizontal segmentation position register 36 is registered in the last column register 42. On the other hand, "0" is set in the vertical cursor register 32 and the starting line register 48, while the value "11" in the first vertical segmentation position register 46 is registered in the last line register 50. When the data in the vertical cursor register 32 coincides with that in the last line register 50, the value "0" in the starting line register 48 is set in the register 32. At the last line of section C, however, the value "11" of the last line register 50 is transferred to the registers 48 and 32 while the value "16" is set in the register 50. The cursor therefore completes its movement for each segmented section and proceeds from sections A to G in order, as shown in FIG. 4. In the event that the screen is required to be segmented into three sections vertically, the second vertical segmentation position register 52 should be used in addition. There are provided $m$ vertical segmentation position registers. The use of up to the m-th vertical segmentation position register 54 enables the vertical segmentation of the screen into $(m + 1)$ sections.

According to the present invention, the cursor is moved separately within each of a plurality of sections into which the screen is divided, so that upon completion of movement in one section, the cursor transfers to another section. This makes possible systematic operation of the keyboard. Further, the fact that the above-mentioned cursor movement is effected independently of the process control functions of the external computer simplifies the software thereof.

Furthermore, the device according to the invention may be so constructed that the cursor is allowed to move only in one of the screen sections or it is prevented from being displayed in a specified screen section.

We claim:

1. A cursor movement control device for a screen-segmented display apparatus, comprising at least one segmentation position register for storing a segmentation position of a display screen, a starting position register for storing the starting position of cursor display in each section, a last position register for storing the last position of cursor display in said section, a cursor register for storing the cursor position on display, and cursor control means for altering the data in said registers in response to a command from an external source, said cursor control means including means for causing said cursor register to store the data of said starting position register when the data in said cursor register coincides with that in said last position register and means responsive to completion of cursor movement required in one section for storing the starting position of another section associated with the next cursor display in said starting position register while at the same time storing the last position of said section associated with said next cursor display in said last position register.

2. A cursor movement control device for a screen-segmented display apparatus, comprising at least one horizontal segmentation position register for storing a horizontal segmentation position of a display screen, a starting column register for storing the starting position of a section associated with cursor display, a last column register for storing the last column of said section, a horizontal cursor register for storing the horizontal position of the cursor on display, a vertical cursor register for storing the vertical position of said cursor on display, and cursor control means for altering the data in said registers in response to a command from an external source, said cursor control means including means for causing said horizontal cursor register to store the data of said starting column register while at the same time supplying to said vertical cursor register a signal for advancing the cursor by one line when the data in said horizontal cursor register coincides with that in said last column register and means responsive to completion of cursor movement in one screen section for transferring the starting column of another screen section associated with the next cursor display from said last column register to said starting column register and said horizontal cursor register, while at the same time transferring the last column of said screen section associated with the next cursor display from said horizontal segmentation position register to said last column register, and means for altering the data in said vertical cursor register to the starting line.

3. A device according to claim 2, further comprising at least one vertical segmentation position register for storing the vertical segmentation position of the display screen, a starting line register for storing the starting line of the screen section associated with cursor display, and a last line register for storing the last line of said screen section, said cursor control further including means for storing the starting line of the screen section associated with the next cursor display in said starting line register and to store the last line of said screen section associated with the next cursor display in said last line register when the vertical extent of said screen section associated with the next cursor display is required to be altered.

4. A cursor movement control device for a screen-segmented display apparatus in which the cursor is moved line by line within one divided section, comprising at least one pulse source for generating pulses to shift the cursor, at least one segmentation position register for storing a segmentation position of a display screen, a starting position register for storing the starting position of a cursor in each line on a divided section associated with the cursor display, a last position register for storing the last position of the cursor in each line on the section, a first cursor register for storing the cursor position in a line on the display, means for changing the contents of said first cursor register gradually in response to the pulses from said pulse source and means for storing in said first cursor register the starting position of said starting position register when the contents of said first cursor register coincides with that of said last position register, a second cursor register for storing the line on display, means for changing the contents of said second cursor register so as to set the cursor forward by one line when the contents of said first cursor register coincide with that of said last position register, and means for transferring the starting position of another section associated with the next cursor display to said starting position register and for transferring the last position of said another section to said last position register in accordance with the segmentation position stored in said segmentation position register when the contents of said second cursor register reach a predetermined value representing completion of cursor movement required in one section.

5. A cursor movement control device for a screen-segmentation display apparatus in which the cursor is moved line by line within one divided section, comprising at least one pulse source for generating pulses in order to advance the cursor, at least one horizontal segmentation position register for storing a horizontal segmentation position of a display screen, a starting column register for storing the starting column of cursor display in each line on a divided section associated with cursor display, a last column register for storing the last column of cursor display in each line on the section, a horizontal cursor register for storing the horizontal position of the cursor on display, means for gradually changing the contents of said horizontal cursor register in response to the pulses from said pulse source and means for storing in said horizontal cursor register the starting column of said starting column register when the contents of said horizontal cursor register coincide with that of said last column register, a vertical cursor register for storing the vertical position of said cursor on display, means for changing the contents of said vertical cursor register to set the cursor forward by one line when the contents of said horizontal cursor register coincide with that of said last column register, and means for transferring the starting column of another section associated with the next cursor display to said starting column register and for transferring the last column of said another section to said last column register in accordance with the segmentation position stored in said segmentation position register when the contents of said vertical cursor register reach a predetermined value representing completion of cursor movement required in one section.

6. An apparatus according to claim 5, further comprising at least one vertical segmentation position register for storing the vertical segmentation position of the display screen, a starting line register for storing the starting line of the divided section associated with cursor display, and a last line register for storing the last line of said screen section, said transferring means storing in said starting line register the starting line of the screen section associated with the next cursor display and storing in said last line register the last line of said screen section in accordance with the segmentation position stored in said segmentation position register when the contents of said vertical cursor register reach the predetermined value representing completion of cursor movement required in one section.

* * * * *